United States Patent [19]

Sato et al.

[11] Patent Number: 5,819,094
[45] Date of Patent: Oct. 6, 1998

[54] APPARATUS FOR LOG DATA COLLECTION AND ANALYSIS

[75] Inventors: Yuji Sato; Norihisa Murayama, both of Shizuoka, Japan

[73] Assignee: Fujitsu Ltd., Kawasaki, Japan

[21] Appl. No.: 715,401

[22] Filed: Sep. 18, 1996

[30] Foreign Application Priority Data

Mar. 26, 1996 [JP] Japan .................................. 8-070197

[51] Int. Cl.$^6$ ...................................................... G06F 9/45
[52] U.S. Cl. ............................................................ 395/704
[58] Field of Search .................................... 395/701, 704, 395/705

[56] References Cited

FOREIGN PATENT DOCUMENTS 61-262858  11/1986  Japan .
2-272668   11/1990  Japan .
5-134903    6/1993  Japan .

OTHER PUBLICATIONS

IBM Technical Disclosure Bulletin, vol. 38, No. 03, Mar. 1995, Improving Performance of Trace Analysis Using Visual Editing Functions.

Elektronk Dec. 1995, p. 118–123, "The Diagnosis of Individual Tasks by Tracing" (including Abstract).

*Primary Examiner*—Emanuel Todd Voeltz
*Assistant Examiner*—Peter J. Corcoran, III
*Attorney, Agent, or Firm*—Staas & Halsey

[57] ABSTRACT

An apparatus for log data collection and analysis, which provides a history diagram to visualize program behavior and enhanced tools for analysis by utilizing part-to-part association between the history diagram and a source program. A log data collector collects log records during program execution and stores them in a storage unit. A log data analyzer retrieves and analyzes the records to find the types of program operations and their respective execution time. A diagram generator converts the result of the analysis into a history diagram and outputs it to a display unit. The apparatus further comprises an on-screen position designator and program location analyzer. When a user selects a part of the history diagram, the on-screen position designator obtains its coordinate. The program position analyzer analyzes the coordinate to find a corresponding function and its location in the source program, thus allowing the user to get a function name and line number by simply specifying a part of the history diagram. Moreover, the apparatus comprises a function designator and display position analyzer. When the user specifies a function name and its line number through the function designator, the display position analyzer calculates a corresponding position in the history diagram. Thus, the user can easily locate records of a function of interest in the history diagram.

6 Claims, 10 Drawing Sheets

APPARATUS FOR LOG DATA COLLECTION AND ANALYSIS

BACKGROUND OF THE INVENTION

1. Field of the Invention

The present invention relates to an apparatus for log data collection and analysis, and more specifically, to an apparatus which collects execution history, or log data, of programs for serial or parallel data processing and displays the collected log data to analyze the performance of the programs.

2. Description of the Related Art

In recent years, computer programs have been continuously expanding as well as increasing their complexity, along with the advancement of hardware technologies that enable high-speed data processing. This tendency makes it difficult for software engineers to understand how their programs are actually running. For debugging and maintenance purposes, the engineers often use a log that records an execution history of programs. By collecting the log records and displaying it in proper time sequence, they can visually understand the behavior of the programs.

In pursuit of more powerful aids, software engineers have developed many helpful debugging tools that graphically show the program activities in temporal order. A typical example of such a visualization tool is a program debugging system disclosed in Japanese Patent Laid-open Publication No. Sho 61-262858 (1986). This debugging system collects data of task execution time, task levels, termination status information, and the like, and provides timing diagrams to show the execution history of a plurality of tasks with classification by task level. Another example, Japanese Patent Laid-open Publication No. Hei 5-134903 (1993), discloses a program performance analyzer which also depicts dynamic behavior of programs in the form of a timing diagram by classifying various program operations into separate event types such as tasks, interrupts, and system calls.

Those timing diagrams may be instrumental in helping user's understanding of total operating conditions of programs, however, they have some problems as follows.

First, the above-described conventional diagrams are not informative enough for the user to trace and analyze a source code of the program under test, because of the lack of information about correspondence between each part of the diagram and that of the source code.

Second, the log data consumes too much storage space. Some types of computing jobs require parallel data processing techniques to be applied. Such jobs are lengthy in general, since that is the motivation to introduce parallel processing. Even if the programs themselves are not so lengthy, they will produce an enormous amount of log data, as large-scale programs do, due to their iterative operations. Such massive log files will gobble up the user's disk space.

Third, it takes much time to generate a timing diagram. The collected log data is once stored in a log file, and the log file will be retrieved later for analysis. This log data analysis, however, is a very time-consuming job because of the enormous volume of the subject.

Fourth, the quality of a resultant display is not satisfactory to the user. After the log data analysis, its result will be displayed on a screen in the form of a graph, or a history diagram, which classifies various events in different colors. However, since the usable screen space is limited due to the size of a display unit, each event may be compressed into a narrow band. When the users attempt to display the entire time range of the program in that limited space, they will only see some mere "stripes" appearing on the screen. Particularly when the user's interest is not in the whole range but focused on a small part of the program, the above diagram will offer them nothing worth seeing.

Lastly, the conventional diagrams only provides a limited method of classification of events. The users are unable to define their own criteria for the classification according to the actual program operations that may occur during the execution.

SUMMARY OF THE INVENTION

Taking the above into consideration, a first object of the present invention is to provide an apparatus for log data collection and analysis that can utilize the part-to-part association between a source program and a history diagram indicative of the program operations.

A second object of the present invention is to provide an apparatus for log data collection and analysis that allows the user to collect log data selectively for a desired section of a source program, not to allow the log data file to become too large and not to make the analysis too time-consuming.

A third object of the present invention is to provide an apparatus for log data collection and analysis that enables the user to see further details of an arbitrary section of the log data by specifying a relevant part of the history diagram.

A fourth object of the present invention is to provide an apparatus for log data collection and analysis that permits the user to change color definitions when displaying the collected log data in the form of a history diagram classified with different colors according to the types of program operations.

To accomplish the above objects, according to the present invention, there is provided an apparatus for log data collection and analysis which is used for analyzing behavior of a program. This apparatus comprises log data collecting means, log data storage means, log data analyzing means, diagram generating means, display means, and association analyzing means.

The log data collecting means collects log records while the program is in execution, where each log record includes information regarding an operation type and execution time of each part of the program. The log data storage means stores the log records collected by the log data collecting means. After the program execution is completed, the log data analyzing means retrieves the log records from the log data storage means and analyzing the operation type and the execution time of each log record. The diagram generating means generates a history diagram that visualizes the analyzed log records in temporal order. This history diagram is organized into a plurality of segments that represent the respective log records, and the display means displays the generated history diagram on a screen.

In response to an instruction from a user, the association analyzing means performs analysis of part-to-part association between the displayed history diagram and a source program. The source program is a set of instruction statements from which the program in executable form is translated. The association analyzing means provides the diagram generating means and/or the display means with the part-to-part association clarified through the analysis.

To be more specific about the association analyzing means, it accepts designation by the user of an on-screen position lying on the history diagram, and analyzes the on-screen position so as to find a function name and a program location in the source program that correspond to the on-screen position. The association analyzing means then directs the display means to display the function name and the program location that are found.

Furthermore, the association analyzing means accepts designation of a function name and its location in the source program, and it analyzes the function name and the location so as to find a segment of the history diagram that corresponds thereto. Finally, the association analyzing means directs the diagram generating means to reproduce the history diagram so that the segment be displayed distinguishably from the other part of the history diagram.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
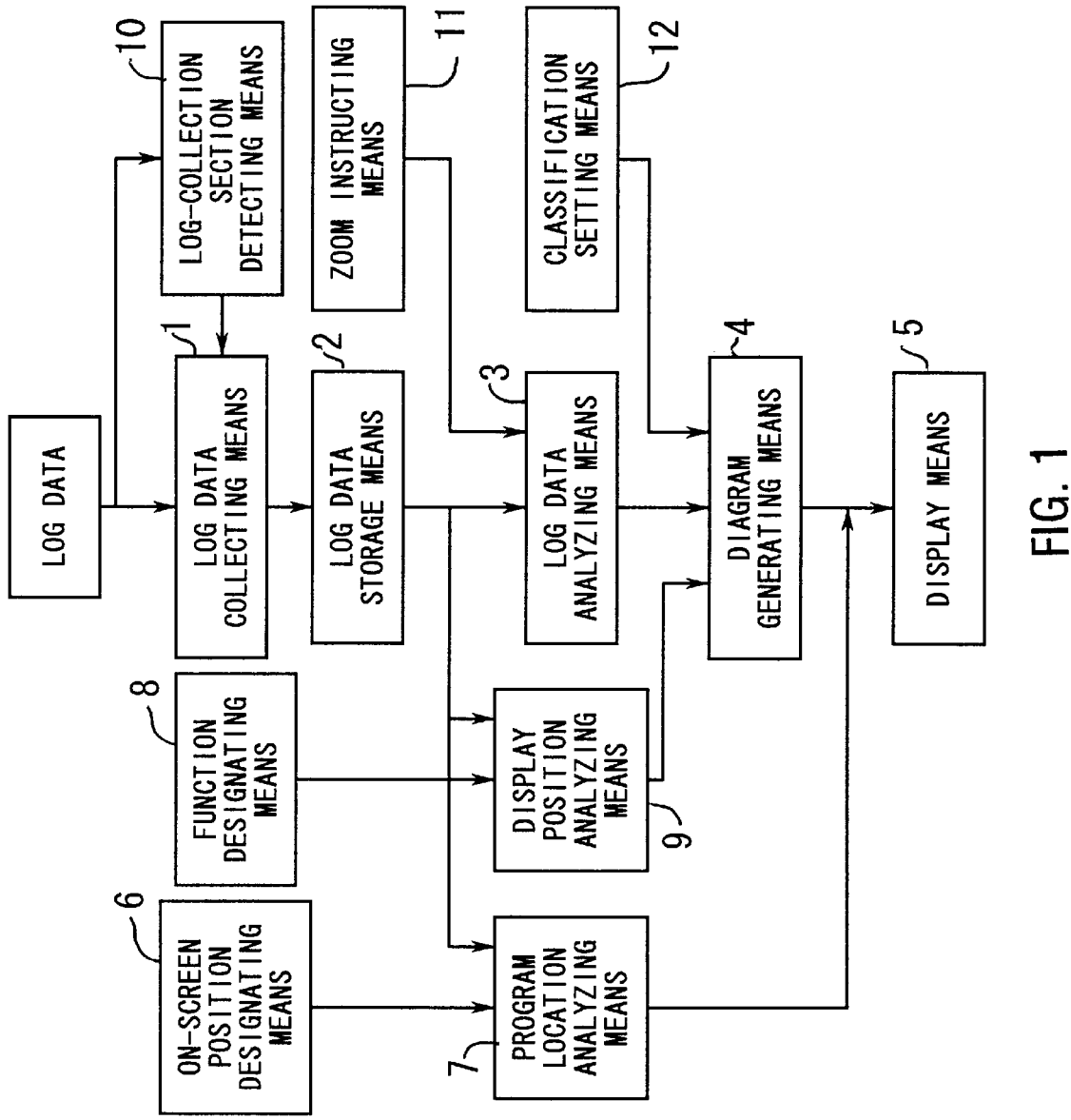
FIG. 1 is a conceptual view of an apparatus for log data collection and analysis according to the present invention.

To outline the present invention, FIG. 1 shows a conceptual view of an apparatus for log data collection and analysis. As the basic structural elements for collecting and analyzing log data, the apparatus comprises the following elements:

log data collecting means 1 for collecting log records while the program is in execution, wherein the log records include information regarding an operation type and execution time of each part of the program, log data storage means 2 for storing the log records collected by the log data collecting means 1, log data analyzing means 3 for retrieving the log records from the log data storage means 2 and analyzing the operation type and the execution time of each log record, diagram generating means 4 for generating a history diagram that visualizes the analyzed log records in temporal order, wherein the history diagram is organized into a plurality of segments that represent the respective log records, and display means 5 for displaying on a screen the history diagram generated by the diagram generating means 4.

In addition to the basic structural elements listed above, the apparatus comprises several elements to enhance its capability of log data analysis as:

on-screen position designating means 6 for accepting designation by the user of an on-screen position lying on the history diagram displayed by the display means 5, program location analyzing means 7 for analyzing the on-screen position so as to find a function name and a program location in the source program that correspond to the on-screen position, and for directing the display means to display the function name and the program location that are found, function designating means 8 for accepting designation of a function name and a location thereof in the source program, and display position analyzing means 9 for analyzing the function name and the location so as to find a segment of the history diagram that corresponds thereto, and for directing the diagram generating means to reproduce the history diagram so that the segment be displayed distinguishably from the other part of the history diagram.

In the above-described structural arrangement, the log data collecting means 1 collects log data of a serial or parallel processing program during its execution. The collected log data is a set of log records, each of which contains information about what kind of operation the program was performing at the sampled time in the process. The log records are stored in the log data storage means 2. After the program execution is completed, the log data analyzing means 3 retrieves the log records from the log data storage means 2 and analyzes them, classifying the types of program operations and calculating their respective execution time. The diagram generating means 4 transcribes the result of the analysis by the log data analyzing means 3 into graphical form, or a history diagram, and outputs it to the display means 5. This history diagram is organized into a plurality of segments that represent the respective log records.

When the user points at a certain segment in the diagram displayed on the display means 5, the on-screen position designating means 6 obtains the coordinate information of that point. The program location analyzing means 7 analyzes the obtained coordinate information to find a corresponding function name and its location in the source program and makes them displayed on a screen of the display means 5.

When the user specifies a function name and its location in the source program by using the function designating means 8, the display position analyzing means 9 calculates a corresponding segment of the history diagram, based on the specified function name and location. The calculated segment position is then supplied to the diagram generating means 4 to emphasize a particular program operation performed in that segment distinguishably from the other ones in the history diagram.

In addition to the above-described structural elements, the apparatus of the present invention comprises the following elements:

log-collection section detecting means 10 for detecting log-collection control instructions embedded in the source program for directing the log data collecting means 1 to collect the log records only in a section designated by the log-collection control instructions, zoom instructing means 11 for zooming in and out of the history diagram displayed, and classification setting means 12 for defining colors used for classification of the program operations.

The user previously puts log-collection control instructions into the source program to specify a log-collection section. When the log-collection section detecting means 10 detects the instructions during the program execution, the log data collecting means 1 collects log records only for the section specified by the detected instructions and stores them into the log data storage means 2. Thus, the user can obtain just what is really necessary, no matter how huge his/her program may be. This also shortens the time for the log data analysis.

Upon receipt of a user's instruction to expand or shrink the timescale of the history diagram, the zoom instructing means 11 forwards it to the log data analyzing means 3. The log data analyzing means 3 then alters the timescale of the history diagram according to the instruction.

The classification setting means 12 defines and modifies the colors, which are used in the history diagram to classify the program operations, to meet the user's demands. By setting the classification colors, the classification setting means 12 instructs the diagram generating means 4 whether to classify the program operations just roughly or rather precisely.

The following description will present a specific embodiment of the present invention.

Before starting the apparatus of the present invention, an executable computer program, or an object program, should be prepared by compiling a source program written in a source language. With compiler options, the object program may contain some special instructions for calling log collection functions that perform logging of the program operations. Those call instructions are inserted by the compiler at the beginning and the end of the program body, and at the entrance and exit of each library function when it is called in the program. Further, when compiling the program, the compiler creates a cross-reference table that associates each function with corresponding line numbers in the source program and their respective addresses in the object program.

During the execution of such an object program and library functions, the log collection functions, which correspond to the log data collecting means 1 in FIG. 1, are called by the program at the beginning and end of the program body and at each entrance and exit of the library functions. When the program branches to the log collection functions, some address information is saved in a stack area: the address of the call instruction and the address to be returned to from the functions. The log collection functions, when called up, will collect a log record and store it into a log file, which corresponds to the log data storage means 2 in FIG. 1.

Figure 2:
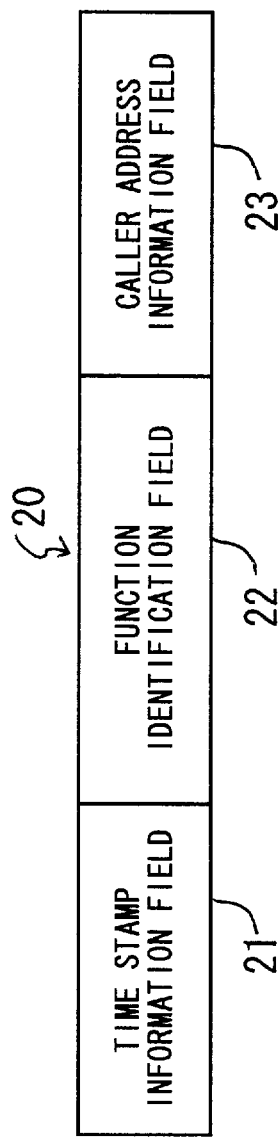
FIG. 2 is a diagram showing data structure of a log file.

FIG. 2 shows the data structure of the log file. Each log record 20, stored as an entry of the log file, is organized into three fields: a time stamp information field 21, a function identification field 22, and a caller address information field 23. The time stamp information field 21 records the time when the process enters and leaves each function that is called in the object program, which time is measured from the start time of the program execution. The function identification field 22 holds a number for identifying a function called by the object program. The caller address information field 23 "mainly" contains the address from which the function is called up. This address can be retrieved from the stack.

The reason of saying "mainly" is that the contents of the caller address information field 23 depend on the type of the function that is called. When a user function is called, the caller address information field 23 indicates the location of that user function. When a library function is directly called by the object program, the caller address information field 23 indicates the location of that call instruction. When one library function is called by (or nested in) another library function, its nesting path should be traced back to reach the original call instruction in the object program and the address of the original call instruction is recorded into the caller address information field 23.

The above-described log records are collected during the program execution and finally sent to a log analyzer, which corresponds to the log data analyzing means 3 in FIG. 1. The log analyzer investigates in detail about how the program was executed with the passage of time. The result of the analysis is then passed to a diagram generator, which corresponds to the diagram generating means 4 in FIG. 1, to generate a history diagram that visualizes the collected log data along the time axis. The history diagram will appear on the screen of a display unit, which corresponds to the display means 5 in FIG. 1.

The following description will focus on the display of the history diagram, with reference to a typical example of a source program and a corresponding object program and library functions.

Figure 3:
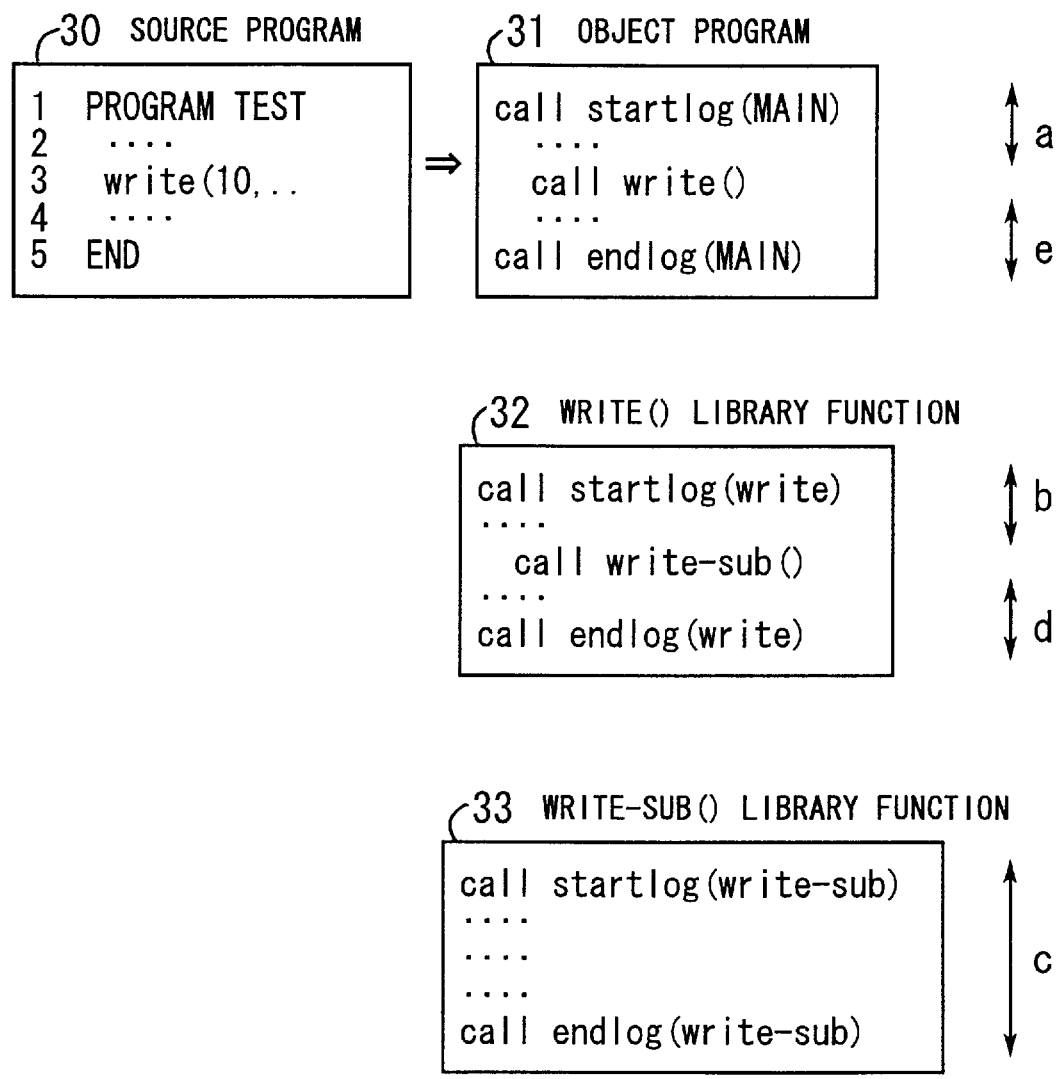
FIG. 3 is a diagram showing an example main program that calls a library function.

FIG. 3 shows such an example, where the main program contains a library function call. A source program 30, a function titled "TEST," calls a library function named "write." Statements in the source program 30 have their respective line numbers at their head portion. The compiler translates the source program 30 into an object program 31. In this compilation process, a compiler option is used to perform log collection at the beginning and the end of the program execution. Thus, in the present example, the object program 31 includes two instructions calling log collection functions "startlog( )" and "endlog( )" at the beginning and the end of its body. The object program 31 calls a library function 32 named "write( )," which further nests another library function 33 named "write-sub( )."

The "write( )" library function 32 calls the log collection functions "startlog( )" and "endlog( )" at the beginning and the end of its body, or the entrance and the exit of that routine. The "write-sub( )" library function 33 also calls them in the same way.

The execution of the above-described program and functions will proceed in the following sequence. The process starts with the object program 31 and continues running for a period "a" until the library function call "write( )" is executed. The process then branches to the "write( )" library function 32 and runs for a period "b" until the library function call "write-sub( )" is executed. The next period "c" is for this "write-sub( )" library function 33. The process returns to the middle of the "write( )" library function 32 and executes the rest of it for a period "d." Finally, the process returns to the middle of the object program 31 and runs for a period "e" to execute the program until the end.

Invoked in each of the object program 31, "write( )" library function 32, and "write-sub( )" library function 33, the log collection functions "startlog( )" and "endlog( )" will produce log records and store them in a log file. Later, the log file is analyzed by the log analyzer so as to classify the program operations and their respective time lengths as indicated by the periods "a" to "e." The analyzed log data will be converted by the diagram generator into a history diagram and finally displayed on the screen of the display unit as described below.

Figure 4:
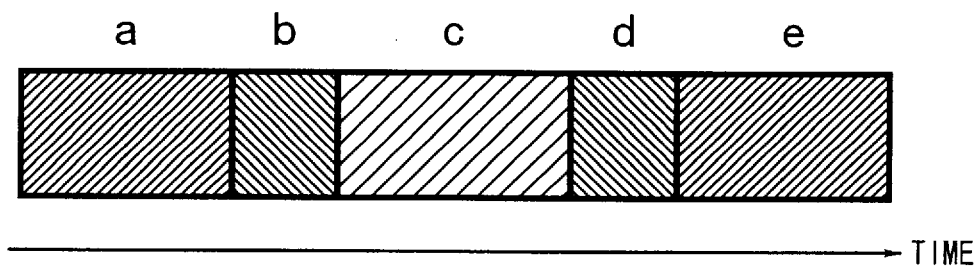
FIG. 4 is a diagram showing an example history diagram.

FIG. 4 illustrates a history diagram showing the execution sequence of the object program 31 and library functions 32 and 33. The history diagram is a single bar graph that consists of several segments representing the above-described time periods "a" to "e" arranged in temporal order, where the length of each segment is proportional to the time length of each period of the program operation. The segments "a" and "e" in FIG. 4 show the function "TEST," the segments "b" and "d" the library function 32 "write( )", and the segment "c" the library function 33 "write-sub( )." The history diagram will appear on the display screen, showing the classified segments with different colors to distinguish the program operations from one another. The colors may be replaced with other visualization techniques such as texture patterns including hatching as seen in FIG. 4.

A simple point-and-click operation on this history diagram provides a user with a source program location of a function of his/her interest. The following description will be devoted to this feature of the apparatus according to the present invention.

The user selects a certain segment in the history diagram on the screen with a pointing device such as a mouse. This is what was explained as the on-screen position designating means 6 in FIG. 1. Analyzing the coordinates specified by the user, a program location finder (i.e., the program location analyzing means 7 in FIG. 1) searches for a function corresponding thereto and its line number in the source program from which the function is called up. The found function name and line number are then presented on the display screen.

When the user pointed at the segment "c," for example, the apparatus finds its location in the source program, based on the address information included in the log records, and it displays the corresponding function name and line number as follows:

"function: TEST line: 3"

Figure 5:
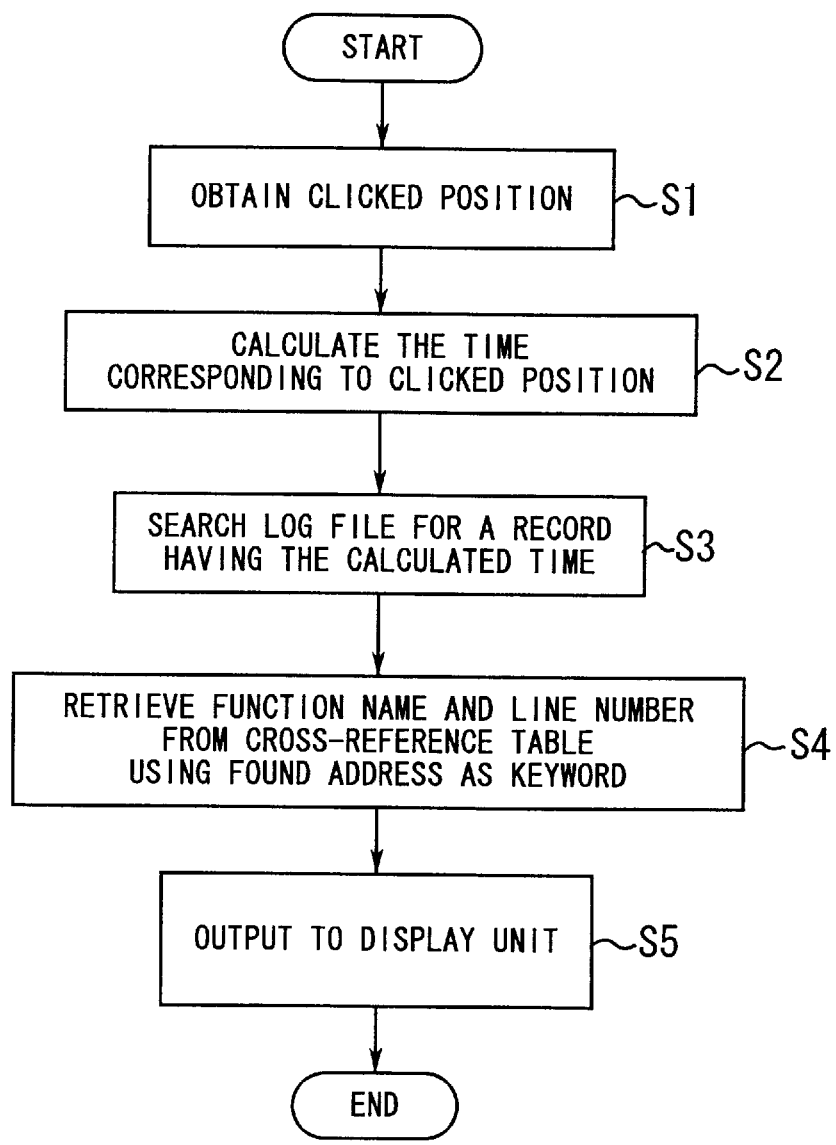
FIG. 5 is a flowchart showing a process to obtain information about a source program corresponding to a specified point in the history diagram.

The following description will provide details about the process to find a function name and line number of the source program according to the specified segment location, with reference to a flowchart of FIG. 5. The process takes the following five steps.

[S1] Upon reception of a mouse click action by the user, the apparatus obtains an on-screen position where the mouse button has been pressed.

[S2] The time corresponding to that clicked position is then calculated. Note that the length of the history diagram indicates the total program execution time, and thus the clicked position indicates elapsed time since the start of the program execution.

[S3] The apparatus searches the log file for a record having the time at the clicked position.

[S4] Address information is extracted from the record found in step S3. This address information resides in the caller address information field 23 explained in FIG. 2. The apparatus obtains a corresponding function name and line number by searching a cross-reference table using the address information as the keyword. This cross-reference table has been created previously by the compiler so that it will associate each function name with corresponding addresses as well as with program line numbers. Because addresses collected in this cross-reference table are discrete ones, the address extracted from the log record may not perfectly coincide with the table entries. Thus the logged address should be examined whether it is within a range between any two consecutive caller addresses, and a function name and line number corresponding to the nearest address will be finally chosen by the apparatus.

[S5] The apparatus outputs the obtained function name and line number to the display unit.

Besides being capable of searching a function name corresponding to a specific segment of the history diagram, the apparatus allows a user to specify a certain portion of the source program in order to focus on a relevant part of the history diagram. The following description will be devoted to this feature of the apparatus.

The user specifies a program location by entering a function name (say, "TEST") and a line number (say, "3") into a function name input window opened on a display screen, which is what has been explained as the function designating means 8 in FIG. 1. The user then clicks a "SEARCH" button to initiate a search operation. In response to this request, a display position analyzer first obtains an address from the line number and then redraws the history diagram so that it will show the found records distinguishably from others. This display position analyzer is what was explained as the display position analyzing means 9 in FIG. 1.

Figure 6:
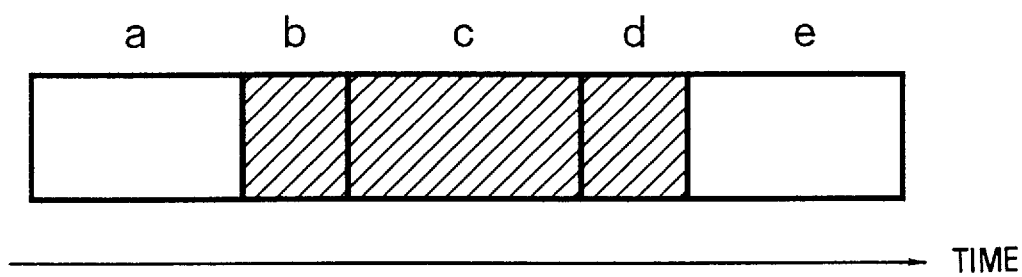
FIG. 6 is a diagram showing a history diagram when a function name and line number are specified.

FIG. 6 shows an example of the history diagram generated through the above-described process in response to the user's request for focusing on the line number "3" in the function "TEST." The display position analyzer first obtains an address corresponding to the entered line number by consulting the cross-reference table. Then it searches the log file for records matching with the obtained address. As a result of this search-by-address operation, the relevant segments of the history diagram are displayed distinguishably from the others. That is, the segments "b" to "d", indicative of library functions called at the line number "3" in the source program, are displayed with a higher video intensity, while the rest of the history diagram is given a low intensity.

The following description will now explain the detailed process of highlighting a specific portion of the history diagram pertaining to a function name and line number provided by the user.

Figure 7:
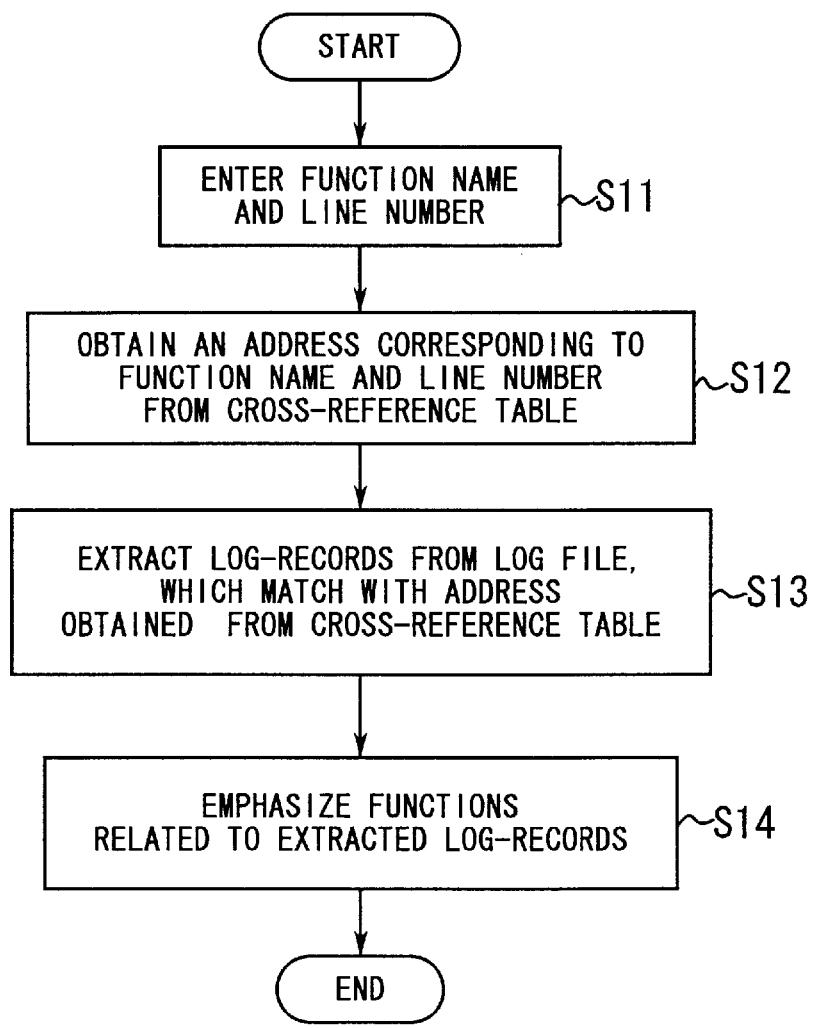
FIG. 7 is a flowchart showing a process to be executed by a display position analyzer to obtain a log record information based on a location in a source program.

FIG. 7 is a flowchart that shows a process to be executed by the display position analyzer for this purpose. The process proceeds according to the following four steps.

[S11] A function name and a line number in the source program are directed to the apparatus through a function name input window opened on the display screen.

[S12] The display position analyzer obtains an address corresponding to the designated function name and line number by consulting the cross-reference table.

[S13] The display position analyzer searches the log file to extract every log record that matches with the address obtained from the cross-reference table. As previously explained, the log records hold addresses only of the very original call instructions contained in the object program, even when the library functions are nested. This means that a plurality of addresses may be associated with one function name. In the above example, three records indicative of the periods "b"–"d" fit the case.

[S14] The display position analyzer directs the diagram generator to reproduce the history diagram that focuses on the functions found in the log records.

As described above, the present invention presents a history diagram to visualize program behavior in the way associative with source program structure, thus enabling the user to enjoy the following benefits.

First, the history diagram can be used for performance analysis of programs. Since the diagram shows the program behavior with the passage of time, the user can easily figure out which part of the program is the most time-consuming. It also allows the user to find a part where inter-process communications are not so optimized that it takes much time to transfer data to or just wait for an indication from the counterpart in parallel processing. When such a part is found, the user can search for a relevant part of the source program and locate the problem that needs improvement.

Second, the history diagram can be used for debugging of programs. Since all the function calls that have happened and their respective origins are shown in time sequence, the user can trace back the history of the program execution. This helps eliminating some kinds of errors that may lead to incorrect results or cause an abnormal termination of the program.

According to the present invention, it is also possible to obtain log data selectively for a desired section of a source program. The following description will introduce an apparatus employing the log-collection section detecting means 10 shown in FIG. 1.

Figure 8:
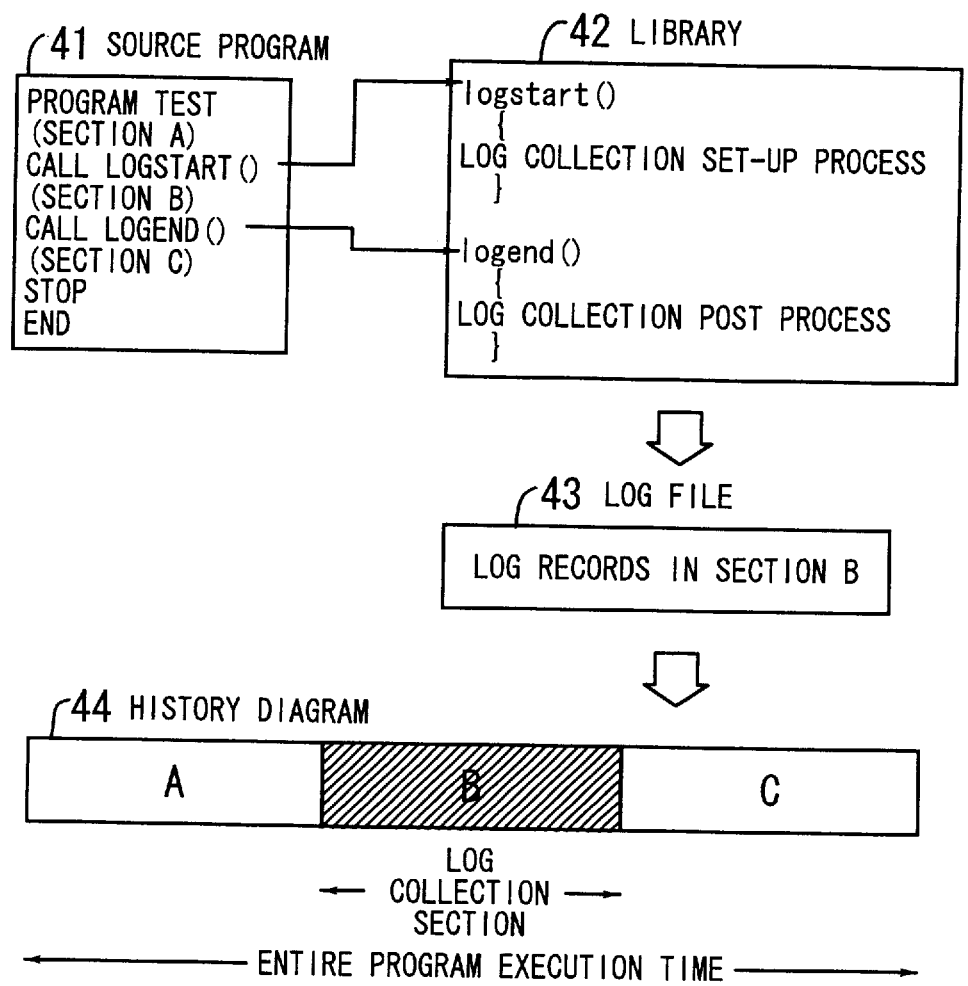
FIG. 8 is a diagram showing an example of a source program including instructions for selectively specifying a section subject to log collection.

FIG. 8 shows an example of a source program including several instructions for selectively specifying a section where log data is to be collected. This example source program 41 consists of three sections A, B, and C, where only the section B is subject to the log collection. To collect log data, the source program 41 calls a log-enabling function "LOGSTART( )" and a log-disabling function "LOGEND( )" before and after the section B, respectively. The user can write those log collection control functions at any place in the source program 41 to specify the subject section.

A library 42, a collection of functions called by the source program 41, includes a log-starting subroutine "logstart" and a log-ending subroutine "logend." The former subroutine provides a log collection set-up process, while the latter a log collection post process.

The log collection set-up process actually sets a log control flag to activate the log collection operations. This log control flag will affect the log collection functions "startlog( )" and "endlog( )," which are called from the object program 31 as well as from library functions 32 and 33. Those functions will produce log records only when the log control flag is set. On the other hand, those functions do nothing, while the flag is reset. As opposed to the log collection set-up process the log collection post process resets the log control flag to disable further logging operations.

Accordingly, the log control flag remains set only while the computer executes routines corresponding to the section B as part of the source program 41, thus activating the log collection functions called in that limited range. As such, a log data collector in the apparatus obtains log records only of the section B, which has been specified by the user, and thus the log file 43 will contain the limited number of records for the section B.

By default, the log data is collected at the beginning and the end of the program. With further collection of the user-specified log data for the section B, the final records yields a history diagram 44 as seen in the bottom of FIG. 8. From this diagram, the user can learn where the section B is occupying in the total program execution time.

The present invention further provides a scaling function for expanding or reducing the view range of the history diagram displayed on a screen to allow a desired section in the program to be focused on. The following description will explain about this scaling function.

Figure 9:
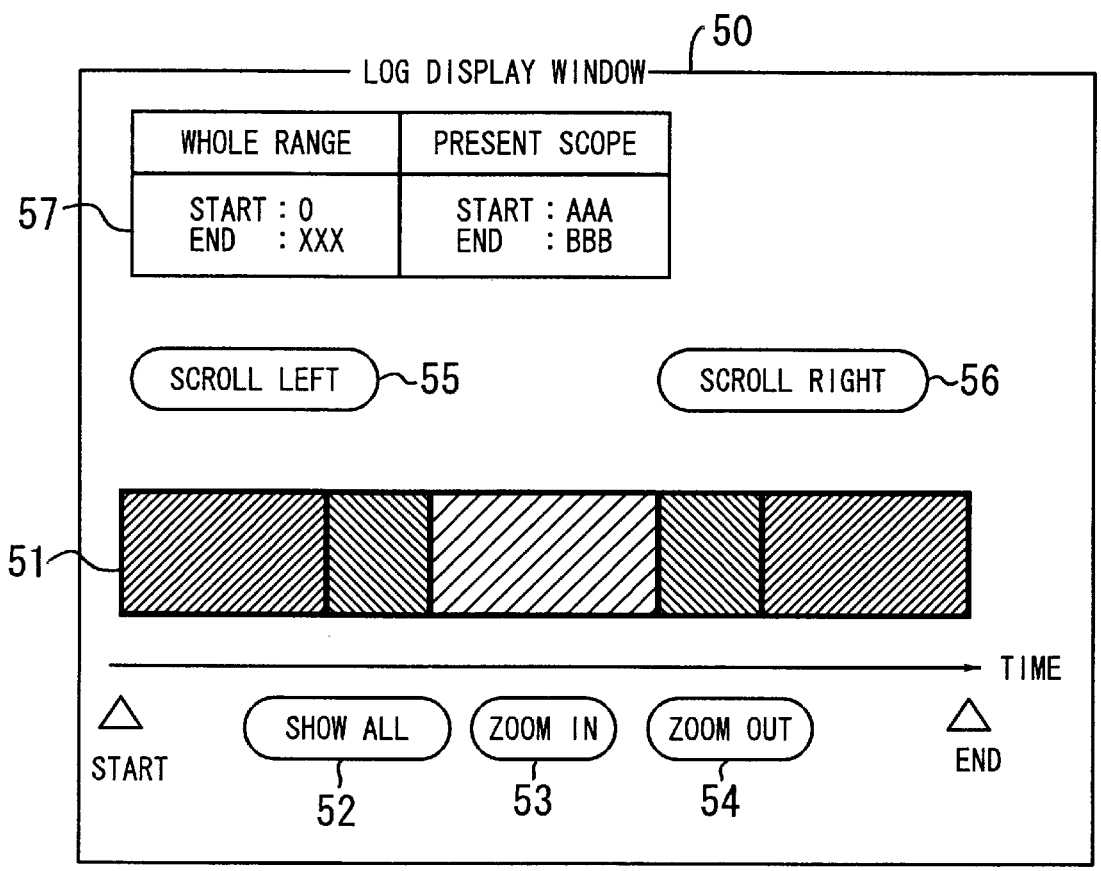
FIG. 9 is a diagram illustrating a log display window.

FIG. 9 illustrates a log display window 50 to offer such a flexible history diagram to the users. This log display window 50 contains:

a diagram view area 51 for displaying a history diagram, a "SHOW ALL" button 52 to fit the entire time range of the history diagram into the diagram view area 51, "ZOOM IN" and "ZOOM OUT" buttons 53 and 54 to vary, continuously or stepwise, the timescale of the history diagram, "SCROLL LEFT" and "SCROLL RIGHT" buttons 55 and 56 to scroll the diagram to the left and right directions when it is zoomed in, and a time indication area 57 to indicate, in numerical form, the time at both endpoints of the diagram view area 51.

To manage this log display window 50, a zoom controller, corresponding to the zoom instructing means 11 in FIG. 1, is equipped with temporary storage to hold positions that the user indicated with a mouse or other pointing devices or to keep the current values of the start time and the end time of the diagram view area 51.

The diagram view area 51 in the log display window 50 normally displays the history diagram for the entire time range. The left column of the time indication area 57, which is titled "WHOLE RANGE," shows the start time "0" along with the end time of the program execution in microseconds.

If the user presses the "ZOOM IN" button 53 in an attempt to obtain more detailed log information, the history diagram will be expanded in the horizontal directions with its center kept at the same position. While the log data at both sides of the diagram view area 51 goes out of sight, the detailed information in the central part will be gradually revealed. Every time the user presses the "ZOOM IN" button 53, the apparatus calculates the start time and end time of the diagram view area 51, and it redraws the history diagram, extracting the log records within that time range. According to this redrawing, the start time and end time saved in the temporary storage are also updated and displayed in the right column of the time indication area 57, titled "PRESENT SCOPE." Those time indicators in the right column show the time elapsed since the start of the program execution.

In the way analogous to the above-described zoom-in process, the user can zoom out of the current focus on a history diagram. When the user presses the "ZOOM OUT" button 54 in an attempt to broaden the view range, the apparatus retrieves the start time and stop time in the temporary storage and calculates new values for them. The apparatus then redraws the history diagram, extracting the log records within that new time range. Since each segment length narrows down, the segments within the diagram view area 51 gather toward the center of the history diagram, and thus the records that have been thrown out of the range will return to the area 51. According to the zoom-in operations, the data in the temporary storage is updated and the time indicators in the "PRESENT SCOPE" column of the time indication area 57 are also refreshed.

If the user presses the "SHOW ALL" button 52 while the history diagram is expanded, the diagram view area 51 will instantly change to a log display for the entire time range of the program execution. In other words, this "SHOW ALL" button 52 enables the user to return from detailed-display mode to outline mode easily.

As such, when the history diagram is expanded, the diagram view area 51 shows only a limited number of log records extracted out of the entire log data according to a given time range. In other words, the user only sees a part of the execution history through a small view window. The user can move, however, this view window to the left or right direction by pressing the "SCROLL LEFT" button 55 or "SCROLL RIGHT" button 56. Synchronized with this view movement, the contents in the diagram view area 51 and the time indicators in the "PRESENT SCOPE" column of the time indication area 57 will be updated.

As an alternative arrangement, the log display window 50 may be configured to have a scroll bar, instead of the "SCROLL LEFT" button 55 and "SCROLL RIGHT" button 56, to shift the view window for showing other portions of the log data. This scroll bar has the advantage that the user can see where in the entire program the diagram view area 51 is currently showing.

As another alternative arrangement, the log display window 50 may be configured to allow the user to indicate the zooming point directly, instead of magnification in the center the diagram view area 51. Using a mouse, the user can click in the diagram view area 51 to specify the point where the zoom operation will take effect.

As still another alternative arrangement, the column "PRESENT SCOPE" of the time indication area 57 may display the start time and end time measured in reference to the start time of a function designated by the user, instead of measuring them from the start of the program.

In the present invention, the log data is displayed on a screen, classified with different colors according to the types of program operations, and the user can specify the colors. The following description will explain about a coloring manager for setting the colors for the classification purpose. This coloring manager is what was described as the classification setting means 12 in FIG. 1.

For displaying a history diagram with color classification to distinguish the program operations, the user defines, say, two color patterns, and the apparatus stores them in a storage unit in the coloring manager. The user can select one of the patterns, back and forth, by clicking buttons or other selective actions, and this greatly helps his/her analytical understanding of the history diagram.

Figure 10A:
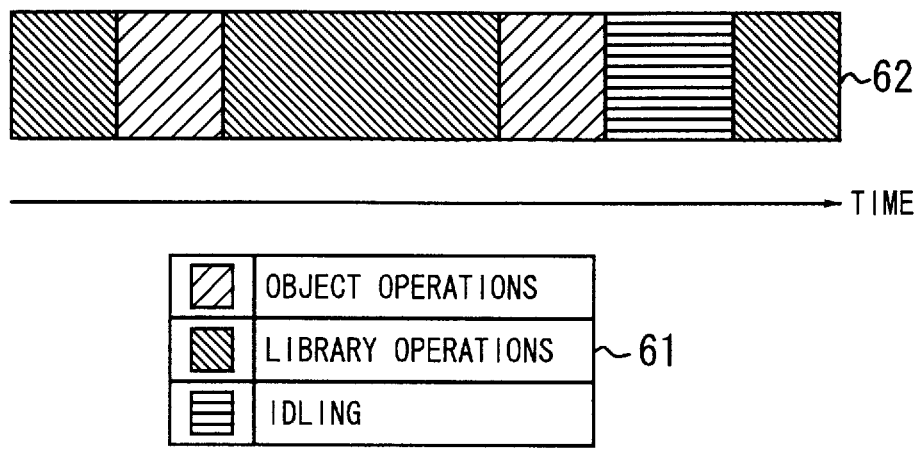
FIGS. 10(A) and 10(B) are diagrams each showing an example history diagram with event classification.
Figure 10B:
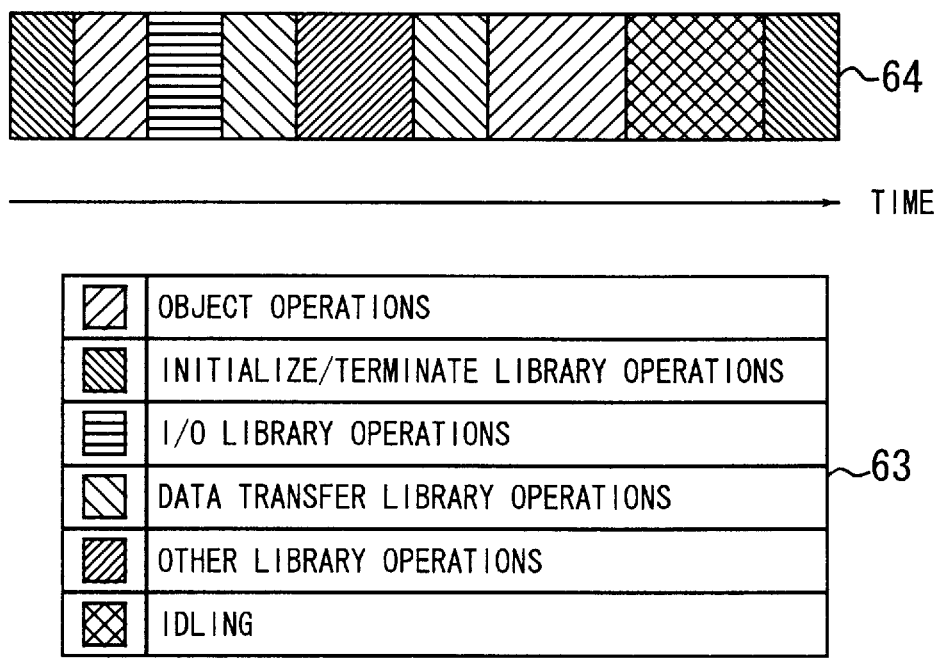

FIGS. 10(A) and 10(B) show two examples of history diagrams with such color classification.

FIG. 10(A) shows a history diagram for the entire program, where a rough color pattern is used to outline the program operations at the base level. The base-level operations are categorized into three groups: object operations, library operations, and idling. Those groups of operations are represented in the history diagram with different colors of the user's choice. The color definitions are stored in a color-operation association table 61. The apparatus refers to the this color-operation association table 61 to select proper colors when generating history diagrams. As a result, the user obtains a history diagram 62 in FIG. 10(A), which distinguishes the three operations in different colors.

FIG. 10(B) shows an example history diagram that introduced the second-level classification of program operations focusing on the base-level library operations described above. This second-level classification subdivides the library operations into four groups: initialize/terminate library operations, I/O library operations, data transfer library operations, and the other library operations. Thus, the program operations will be classified into six groups in total as seen in a color-operation association table 63, where the colors are defined by the user. A history diagram 64 is generated by the apparatus with the definitions registered in this table 63.

The above discussion will be summarized below. The present invention provides an apparatus that collects log records and displays a history diagram to show the collected records graphically. The apparatus is equipped with a means for analyzing the part-to-part association between the displayed history diagram and its corresponding source program in response to instructions from the user. Therefore, the user can find a function name and line number by simply specifying a segment in the history diagram that is of interest. Also, the user can easily locate specific log records in the history diagram by entering a function name and line number. Those capabilities will allow the users to inspect their programs in a visual manner and to locate the problems. In computer-assisted software development, particularly when the subjects are sophisticated serial processing programs or parallel processing programs, the apparatus of the present invention will serve as a strong tool for program debugging and performance analysis.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for log data collection and analysis which is used for analyzing behavior of a program, comprising:

log data collecting means for collecting log records while the program is in execution, each of the log records including information regarding an operation type and execution time of each part of the program;

log data storage means for storing the log records collected by said log data collecting means;

log data analyzing means for retrieving the log records from said log data storage means and analyzing the operation type and the execution time of each log record;

diagram generating means for generating a history diagram that visualizes the analyzed log records in temporal order, the history diagram being organized into a plurality of segments that represent the respective log records;

display means for displaying on a screen the history diagram generated by said diagram generating means; and association analyzing means for performing analysis of part-to-part association between the displayed history diagram and a source program in response to an instruction from a user and for providing said diagram generating means and/or said display means with the part-to-part association clarified through the analysis, wherein the source program is a set of instruction statements from which the program in executable form is translated.

2. An apparatus according to claim 1, said association analyzing means comprising:

on-screen position designating means for accepting designation by the user of an on-screen position lying on the history diagram displayed by said display means; and program location analyzing means for analyzing the on-screen position so as to find a function name and a program location in the source program that correspond to the on-screen position, and for directing said display means to display the function name and the program location that are found.

3. An apparatus according to claim 1, said association analyzing means comprising:

function designating means for accepting designation of a function name and a location thereof in the source program; and display position analyzing means for analyzing the function name and the location so as to find a segment of the history diagram that corresponds thereto, and for directing said diagram generating means to reproduce the history diagram so that the segment be displayed distinguishably from the other part of the history diagram.

4. An apparatus according to claim 1, further comprising log-collection section detecting means for detecting log-collection control instructions embedded in the source program and for directing said log data collecting means to collect the log records only in a section designated by the log-collection control instructions.

5. An apparatus according to claim 1, further comprising zoom instructing means for instructing said log data analyzing means to alter timescale used for the history diagram.

6. An apparatus according to claim 1, wherein said diagram generating means generates the history diagram so that different colors will be assigned to the plurality of segments thereof depending on the operation types included in the respective log record, the apparatus further comprising classification setting means for defining the colors used by said diagram generating means.

* * * * *